(12) United States Patent
Sugawara et al.

(10) Patent No.: US 12,228,753 B2
(45) Date of Patent: *Feb. 18, 2025

(54) ANTI-GLARE FILM

(71) Applicant: DAICEL CORPORATION, Osaka (JP)

(72) Inventors: Yoshitaka Sugawara, Tokyo (JP); Masaki Hayashi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,161

(22) Filed: Dec. 8, 2023

(65) Prior Publication Data

US 2024/0103206 A1 Mar. 28, 2024

Related U.S. Application Data

(60) Continuation of application No. 18/194,302, filed on Mar. 31, 2023, now Pat. No. 11,880,051, which is a division of application No. 16/618,530, filed as application No. PCT/JP2018/023953 on Jun. 25, 2018, now Pat. No. 11,650,357.

(30) Foreign Application Priority Data

Aug. 4, 2017 (JP) ................................ 2017-151463

(51) Int. Cl.
G02B 5/02 (2006.01)
(52) U.S. Cl.
CPC ......... *G02B 5/0242* (2013.01); *G02B 5/0268* (2013.01)
(58) Field of Classification Search
None
See application file for complete search history.

(56) References Cited

U.S. PATENT DOCUMENTS

| | | |
|---|---|---|
| 2002/0012086 A1 | 1/2002 | Uchida et al. |
| 2007/0298193 A1 | 12/2007 | Nakamura et al. |
| 2009/0002831 A1 | 1/2009 | Mikami et al. |
| 2009/0279176 A1 | 11/2009 | Wang et al. |
| 2012/0013987 A1 | 1/2012 | Oki |
| 2014/0254020 A1 | 9/2014 | Sakajiri et al. |
| 2017/0022343 A1 | 1/2017 | Sakakibara et al. |
| 2017/0052288 A1 | 2/2017 | Ludemann et al. |
| 2018/0022881 A1 | 1/2018 | Seki et al. |
| 2018/0252848 A1 | 9/2018 | Ludemann et al. |
| 2021/0141129 A1 | 5/2021 | Hayashi |

FOREIGN PATENT DOCUMENTS

| | | |
|---|---|---|
| JP | 2003-207945 A | 7/2003 |
| JP | 3559505 B2 | 9/2004 |
| JP | 2006-106224 A | 4/2006 |
| JP | 2006-113561 A | 4/2006 |
| JP | 2007-90613 A | 4/2007 |
| JP | 2007-207482 A | 8/2007 |
| JP | 2009-109702 A | 5/2009 |
| JP | 2009-175041 A | 8/2009 |
| JP | 2010-128429 A | 6/2010 |
| JP | 2012-133066 A | 7/2012 |
| JP | 2013-237211 A | 11/2013 |
| JP | 2014-38362 A | 2/2014 |
| JP | 2014-85371 A | 5/2014 |
| JP | 2014-102356 A | 6/2014 |
| JP | 2015-132744 A | 7/2015 |
| JP | 2015-172835 A | 10/2015 |
| JP | 2015-196347 A | 11/2015 |
| JP | 2016-50950 A | 4/2016 |
| JP | 2016-107497 A | 6/2016 |
| JP | 2016-170779 A | 9/2016 |
| JP | 2016-182744 A | 10/2016 |
| JP | 6719677 B2 | 7/2020 |
| WO | WO 2006/106757 A1 | 10/2006 |
| WO | WO 2015/145618 A1 | 10/2015 |

OTHER PUBLICATIONS

"Galaxy S4," URL://https/www.gsmarena.comsamsung_i9500_galaxy_s4-5125.php (2013).
"Glare-proof film" evaluation, Equipment Film Sparkle Analyzer Products, [online], Jul. 2, 2016 Day 1 (Prepared), Daicel Corporation, Daicel Homepage [2021] Search Mar. 8, Internet<URL:https://www.daicel.com/business/New-solution/high-performance-film/pdf/features01.pdf>.
International Preliminary Report on Patentability and English translation of the Written Opinion of the International Searching Authority for International Application No. PCT/JP2018/023953, dated Feb. 13, 2020.
International Search Report for International Application No. PCT/JP2018/023953, dated Sep. 18, 2018, with English translation.
JIS Determination for magnitude of display sparkle JIS C 1006 (2019), pp. 1-30.
Machine Translation of JP 2014-006448. Retrived Oct. 6, 2022.
Notice of Revocation issued Dec. 13, 2021, in Japanese Patent Application No. 2019-533967.

(Continued)

*Primary Examiner* — Prashant J Khatri

(74) *Attorney, Agent, or Firm* — Birch, Stewart, Kolasch & Birch, LLP

(57) ABSTRACT

An anti-glare film is attached on a surface of a display, and includes an anti-glare layer. The anti-glare layer is set to have a sparkle value falling within a range from 6 to 10, which is defined based on a value of a standard deviation of luminance distribution of the display under a state in which the anti-glare film is attached on the surface of the display, a value of specular gloss of 30% or less, which is measured with 60-degree specular gloss, a value of transmission image clarity of 60% or less, which has an optical comb of 0.5 mm, and a haze value of 50% or less. Consequently, satisfactory anti-glare property can be provided while appropriately suppressing sparkle on the display.

4 Claims, 2 Drawing Sheets

(56) References Cited

OTHER PUBLICATIONS

Office Action issued May 10, 2021 in Japanese Patent Application No. 2021-700175.
Ohashi et al., "Fundamental Study on Cylindrical Blasting", etc., [online], Sep. 2012, Journal of the Japan Society for Abrasive Technology (journal of the Japanese Society for the Processing of Wheat Grains), vol. 56, No. 9, p. 626-631, [Search Mar. 5, 2021]Internet<https://www.istage.ist.go in/article/isat/56/9/56. 62.
Website of Sekisui Chemical Co., Ltd. httpswww.sekisui.co.jpcsproductsslecdatasheet1307452_30973.html; accessed Dec. 15, 2021.

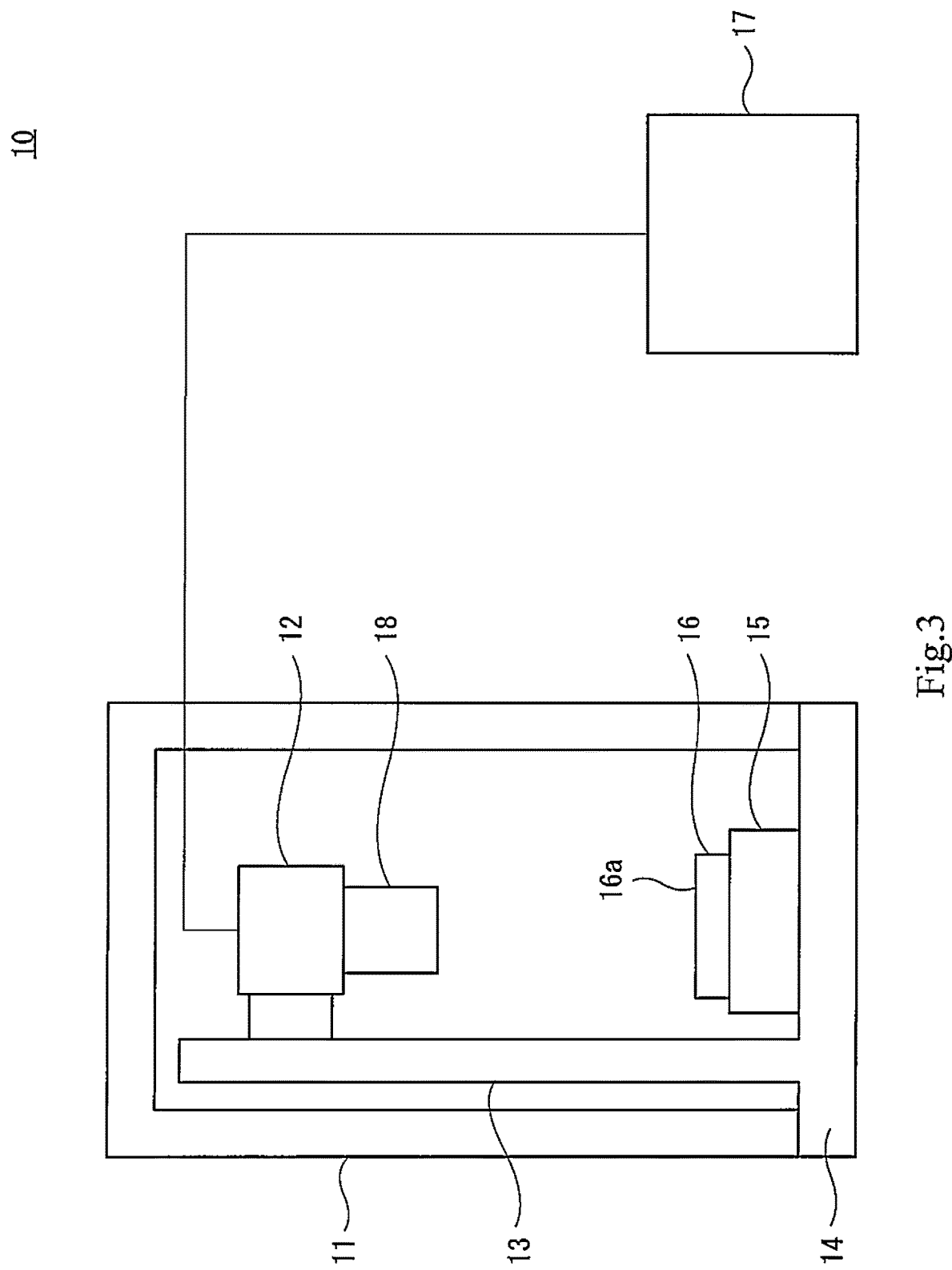

ANTI-GLARE FILM

CROSS-CITE TO RELATED APPLICATIONS

This application is a continuation of U.S. application Ser. No. 18/194,302 filed Mar. 31, 2023, which is a divisional of U.S. application Ser. No. 16/618,530 filed Dec. 2, 2019 (now U.S. Pat. No. 11,650,357 B2 issued May 16, 2023), which is the National Phase of PCT International Application No. PCT/JP2018/023953, filed Jun. 25, 2018, which claims priority under 35 U.S.C. § 119(a) to Patent Application No. 2017-151463, filed in Japan on Aug. 4, 2017, all of which are hereby expressly incorporated by reference into the present application.

TECHNICAL FIELD

The present invention relates to an anti-glare film that prevents external light from reflecting on a display surface.

BACKGROUND ART

An anti-glare film is, for example, a film having a roughened surface on which recesses and protrusions are formed. The anti-glare film is attached on a surface of a display, and prevents external light from reflecting on a display by scattering the external light.

Examples of a method of forming recesses and protrusions on the surface of the anti-glare film include a method of dispersing fine particles (filler) in a matrix resin (hereinafter, referred to as a fine particle dispersion method) as disclosed in Patent Document 1, a method of utilizing a phase separation structure formed from a liquid phase of a plurality of polymers by spinodal decomposition (hereinafter, referred to as a phase separation method) as disclosed in Patent Document 2, a method of transferring and molding an irregular shape with a die (hereinafter, referred to as a transfer molding method) as disclosed in Patent Document 3, and the like.

CITATION LIST

Patent Document

Patent Document 1: JP 2009-109702 A
Patent Document 2: JP 3559505 B
Patent Document 3: JP 2014-102356 A
Patent Document 4: JP 2012-231496

SUMMARY OF INVENTION

Technical Problem

When the anti-glare film is attached on the surface of the display, external light is prevented from reflecting on the display. However, display performance of the display through the anti-glare film is degraded in some cases.

Particularly, in a case where the anti-glare film is attached on a surface of a display with high resolution pixels or the like, sparkle is caused when light transmitting from the display through the anti-glare film is refracted on the recesses and protrusions on the surface of the anti-glare film or when the pixels of the display are magnified and visually recognized due to a lens effect of the recesses and protrusions on the surface of the anti-glare film. As a result, an image is hard to be visually recognized.

As a method of suppressing sparkle, for example, it is conceivable to reduce the recesses and protrusions on the surface of the anti-glare film. However, when the recesses and protrusions on the surface of the anti-glare film are reduced, there may be a risk of degradation of anti-glare property.

In view of this, the present invention has an object to provide an anti-glare film having satisfactory anti-glare property while appropriately suppressing sparkle on a display.

Solution to Problem

An anti-glare film according to an embodiment of the present invention is attached on a surface of a display, and includes an anti-glare layer. The anti-glare layer is set to have a sparkle value falling within a range of from 6 to 10, which is defined based on a value of a standard deviation of luminance distribution of the display under a state in which the anti-glare film is attached on the surface of the display, a value of specular gloss of 30% or less, which is measured with 60-degree specular gloss, a value of transmission image clarity of 60% or less, which has an optical comb of 0.5 mm, and a haze value of 50% or less.

Here, the sparkle value is a value being an objective indicator capable of evaluating sparkle on the display quantitatively. Specifically, the sparkle value is a value defined based on a value of a standard deviation of the luminance distribution of the display, and indicates an extent of distribution of bright spots on the display.

Further, each of a haze value and transmissive clarity is a value relating to quality of anti-glare property. A relationship in which a larger haze value indicates higher anti-glare property, and less transmissive clarity indicates higher anti-glare property is established. However, when the haze value is excessively large, light from a light source is scattered at a wide angle, which causes a problem of unsharpness of a character.

For example, when the anti-glare layer is formed by the phase separation method, the sparkle value, the specular gloss, the transmission image clarity, and the haze value are achieved by adjusting kinds of phase separation materials to be combined, a heating temperature for composition in a drying process, a flow rate of a drying air caused to blow against the composition, or a linear speed during manufacturing. Further, for example, when the anti-glare layer is formed by the fine particle dispersion method, the anti-glare layer is achieved by adjusting a difference between the refractive index of the matrix resin and the refractive index of the plurality of fine particles dispersed in the matrix resin to fall within a predetermined range during manufacturing. Further, a difference in refractive indexes of the matrix resin and the fine particles falls within a predetermined range by selecting materials of the two having a predetermined refractive index difference and adjusting a shape of the fine particle, the number and density of the fine particles included in the matrix resin, and the like. Moreover, a value of a ratio $G_2/G_1$ of a weight $G_1$ of the matrix resin and a total weight $G_2$ of the plurality of fine particles is adjusted.

According to the above-mentioned configuration, the anti-glare layer has a sparkle value falling within a range from 6 to 10, and hence can be set while suppressing sparkle effectively based on the quantitative evaluation.

Further, the anti-glare layer is set to have
a haze value of 50% or less and a value of the transmission image clarity of 60% or less. Thus, high anti-glare property can be achieved while generation of unsharpness of a character is suppressed.

Moreover, the specular gloss measured with 60-degree specular gloss is set to a value falling within a range of 30% or less, which is a small value, and hence reflection of external light can be suppressed.

Thus, the anti-glare film according to an embodiment of the present invention exerts an effect of having satisfactory anti-glare property while appropriately suppressing sparkle on a display.

Further, in the above-mentioned configuration of the anti-glare film according to an embodiment of the present invention, the anti-glare layer may include a plurality of resin components, and a co-continuous phase structure formed by phase separation of the plurality of resin components may be provided.

Further, in the above-mentioned configuration of the anti-glare film according to an embodiment of the present invention, the anti-glare layer may include a matrix resin and a plurality of fine particles dispersed in the matrix resin, and a difference of refractive indexes of the plurality of fine particles and the matrix resin may fall within a range from 0 to 0.07.

As described above, a difference in refractive indexes of the matrix resin and the fine particles is set within a predetermined range, and the plurality of fine particles are dispersed in the matrix resin. Consequently, satisfactory anti-glare property can be provided while appropriately suppressing sparkle on the display.

Further, in the above-mentioned configuration of the anti-glare film according to an embodiment of the present invention, a ratio G2/G1 of a weight G1 of the matrix resin of the anti-glare layer and a total weight G2 of the plurality of fine particles included in the anti-glare layer may be a value falling within a range from 0.02 to 0.15.

Consequently, the anti-glare film including the anti-glare layer having a structure in which the plurality of fine particles are dispersed in the matrix resin can be manufactured satisfactorily.

Advantageous Effects of Invention

The present invention is configured as described above, and the anti-glare film exerts an effect of having satisfactory anti-glare property while appropriately suppressing sparkle on a display.

BRIEF DESCRIPTION OF DRAWINGS

FIG. 3 is a view illustrating one example of a schematic configuration of a sparkle measurement apparatus according to an embodiment of the present invention.

DESCRIPTION OF EMBODIMENTS

Figure 1:
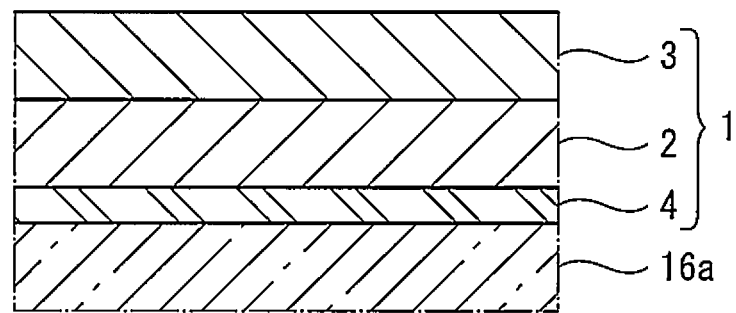
FIG. 1 is a cross-sectional view illustrating a configuration of an anti-glare film according to an embodiment of the present invention.

With reference to the drawings, embodiments of the present invention are described. FIG. 1 is a cross-sectional view illustrating a configuration of an anti-glare film 1 according to an embodiment of the present invention. The anti-glare film 1 is attached on a surface of a display 16a of a display device 16 (see FIG. 3). The anti-glare film 1 includes a substrate film 2, an anti-glare layer 3, and an adhesive layer 4.

The substrate film 2 is arranged between the surface of the display 16a and the anti-glare layer 3, and supports the anti-glare layer 3. The adhesive layer 4 is arranged between the surface of the display 16a and the substrate film 2, and fixes the anti-glare film 1 to the surface of the display 16a.

The anti-glare layer 3 is formed on at least one surface of the substrate film 2. The anti-glare layer 3 provides anti-glare property to the anti-glare film 1, and prevents external light from reflecting on the display 16a by causing the external light to scatter and reflecting. The anti-glare layer 3 also functions as a hard coat (HC) layer that covers the surface of the substrate film 2. As an example, the anti-glare layer 3 includes a plurality of phase-separable resin components.

The anti-glare layer 3 is set to have a sparkle value falling within a range from 6 to 10. Note that, the sparkle value is defined based on a value of a standard deviation of luminance distribution of the display 16a under a condition in which the anti-glare film 1 is attached on the surface of the display 16a. The sparkle value can be obtained through use of a sparkle measurement apparatus 10 described later.

Further, the anti-glare layer 3 is set, and thus transmission image clarity (image clarity) having an optical comb width of 0.5 mm has a value falling within a range of 60% or less. The transmission image clarity is a scale for quantitating unsharpness and distortion of light transmitted through the anti-glare layer 3, and is a measured value obtained by a measurement method in accordance with JIS K7105.

Further, the anti-glare layer 3 is set to have a haze value falling within a range of 50% or less. The haze value in the present embodiment is a measured value obtained by a measurement method in accordance with JIS K7136.

Further, the anti-glare layer 3 is set, and thus specular gloss (60-degree gloss) measured with 60-degree specular gloss has a value falling within 30% or less. The specular gloss is generally referred to as gloss indicating a value of a degree of specularly reflected light on an object surface, and is a measured value obtained by a measurement method in accordance with JIS K7136.

As described above, the anti-glare film 1 according to the present embodiment can be designed through use of the sparkle value being an objective quantitative evaluation for sparkle, and thus the sparkle value falls within a range from 6 to 10. Thus, for example, as compared to a case where design is provided based on a value indicating a sparkle degree by a subjective evaluation, sparkle can be stably suppressed within a desired ranged.

Further, the value of the transmissive clarity can be suppressed within a range of 60% or less while suppressing the haze value to fall within a range of 50% or less. Thus, high anti-glare property can be achieved while suppressing unsharpness of a character.

Further, the specular gloss (60-degree gloss) measured with 60-degree specular gloss is set to a value falling within a range of 30% or less, which is a small value, and hence the anti-glare layer 3 can suppress reflection of external light on the surface of the display 16a.

The adhesive layer 4 is arranged between the surface of the display 16a and the substrate film 2, and fixes the anti-glare film 1 to the surface of the display 16a.

Now, specific examples of the substrate film 2 and the anti-glare layer 3 are described. Note that, description is given with an anti-glare layer 3 formed by the phase separation method as the anti-glare layer 3 in a first embodiment, an anti-glare layer 3 formed by the fine particle dispersion method as the anti-glare layer 3 in a second embodiment, and an anti-glare layer 3 formed by the transfer molding method as the anti-glare layer 3 in a third embodiment.

Substrate Film

As a material of the substrate film 2, for example, glass, ceramics, and a resin can be exemplified. As the resin, a resin similar to a material of the anti-glare layer 3 can be used. Examples of the preferable material of the substrate film 2 include a transparent polymer such as a cellulose derivative (cellulose acetate such as cellulose triacetate (TAC) and cellulose diacetate, and the like), a polyester resin (polyethylene terephthalate (PET), polyethylene naphthalate (PEN), polybutylene terephthalate (PBT), polyarylate resin, and the like), a polysulfone resin (polysulfone, polyethersulfone (PES), and the like), a polyetherketone resin (polyetherketone (PEK), polyetheretherketone (PEEK), and the like), a polycarbonate resin (PC), a polyolefin resin (polyethylene, polypropylene, and the like), a cyclic polyolefin resin (a film "ARTON" (trade name) available from JSR Corporation, a film "ZEONEX" (trade name) available from Zeon Corporation, and the like), a halogen-containing resin (polyvinylidene chloride, and the like), a (meth)acrylate-based resin, a styrene-based resin (polystyrene, and the like), and a vinyl acetate or vinyl alcohol resin (polyvinyl alcohol, and the like).

The substrate film 2 may be stretched uniaxially or biaxially, but preferably is optically isotropic and has a low index of refraction. As the optically isotropic substrate film 2, an unstretched film can be exemplified.

A thickness dimension of the substrate film 2 can be set as appropriate, and preferably is a value falling within a range of, for example, from 5 μm to 2000 μm, more preferably a value falling within a range from 15 μm to 1000 μm, even more preferably a value falling within a range from 20 μm to 500 μm.

First Embodiment

Configuration of Anti-Glare Layer according to First Embodiment

The anti-glare layer 3 in the first embodiment has a phase separation structure with a plurality of resin components. As one example, the anti-glare layer 3 in the first embodiment has a structure in which a plurality of long and slender protruding (string-like shape or thready shape) parts are formed on the surface due to a phase separation structure with a plurality of resin components. The long and slender protruding parts are branched, and form a co-continuous phase structure in a dense state.

The anti-glare layer 3 in the first embodiment exerts anti-glare property with the plurality of long and slender protruding parts and recessed parts positioned between the adjacent long and slender protruding parts. The anti-glare film 1 includes the anti-glare layer 3 described above, and hence is excellent in balance of the haze value and the transmission image clarity. The long and slender protruding parts are formed substantially in a mesh-like shape. Consequently, the surface of the anti-glare layer 3 in the first embodiment has a mesh-like structure, in other words, a plurality of continuous or partly-missing irregular loop structures.

The structure described above is formed on the anti-glare layer 3 in the first embodiment, and thus formation of a lens shaped (sea-island shaped) convex part on the anti-glare layer 3 can be prevented. Thus, light transmitted from the display 16*a* through the anti-glare layer 3 in the first embodiment is prevented from being refracted on the recesses and protrusions on the surface of the anti-glare layer 3, and the pixels of the display 16*a* are prevented from being magnified and visually recognized due to a lens effect of the recesses and protrusions on the surface of the anti-glare layer 3. As a result, sparkle on the display 16*a* can be suppressed. Consequently, even when the anti-glare film 1 is attached on the display 16*a* with high resolution pixels, sparkle can be suppressed at a high degree while securing anti-glare property, and unsharpness of a character and the like can also be suppressed.

Note that, the plurality of long and slender protruding parts may be independent from or continuous to each other. As described later, the phase separation structure of the anti-glare layer 3 in the first embodiment is formed by spinodal decomposition from a liquid phase (wet spinodal decomposition) through use of a solution being a raw material of the anti-glare layer 3. With regard to details of the anti-glare layer 3 in the first embodiment, for example, description of Patent Document 4 can be referred.

Material of Anti-Glare Layer in First Embodiment

The plurality of resin components included in the anti-glare layer 3 in the first embodiment are only required to be phase-separable. From a viewpoint of obtaining the anti-glare layer 3 having the long and slender protruding parts and achieving high scratch resistance, the plurality of resin components included in the anti-glare layer 3 preferably include a polymer and a curable resin.

As a polymer included in the anti-glare layer 3 in the first embodiment, for example, a thermoplastic resin is exemplified. Examples of the thermoplastic resin include a styrene resin, a (meth)acrylic polymer, an organic acid vinyl ester polymer, a vinyl ether polymer, a halogen-containing resin, an olefin resin (including an alicyclic olefin resin), a polycarbonate resin, a polyester resin, a polyamide resin, a thermoplastic polyurethane resin, a polysulfone resin (polyethersulfone, polysulfone, and the like), a polyphenylene ether resin (polymer of 2,6-xylenol), a cellulose derivative (cellulose esters, cellulose carbamates, cellulose ethers, and the like), a silicone resin (polydimethylsiloxane, polymethylphenylsiloxane, and the like), and rubber or elastomer (diene rubber such as polybutadiene and polyisoprene, a styrene-butadiene copolymer, an acrylonitrile-butadiene copolymer, acrylic rubber, urethane rubber, silicone rubber, and the like). These thermoplastic resins can be used alone or in combination of two or more.

A polymer having a functional group participating in a cure reaction or a functional group reacting with a curable compound may also be exemplified. The polymer may have a functional group at a principal chain or at a side chain.

Examples of the functional group include a condensible group, a reactive group (such as a hydroxyl group, an acid anhydride group, a carboxyl group, an amino group or an imino group, an epoxy group, a glycidyl group, and an isocyanate group), and a polymerizable group (a $C_{2-6}$ alkenyl group such as vinyl, propenyl, isopropenyl, butenyl, and allyl, a $C_{2-6}$ alkynyl group such as ethynyl, propynyl, and butynyl, a $C_{2-6}$ alkenylidene group such as vinylidene, and a group having a polymerizable group thereof (such as (meth)acryloyl group). Of those functional groups, a polymerizable group is preferred.

Further, the anti-glare layer 3 in the first embodiment includes a plurality of kinds of polymers. Each of the polymers may be phase-separable from a liquid phase by spinodal decomposition, or may be non-miscible to each other. A combination of a first polymer and a second polymer included in the plurality of kinds of polymers is not particularly limited, and the polymers that are non-miscible to each other at a temperature around a process temperature may be used.

For example, when the first polymer is a styrene resin (polystyrene, a styrene-acrylonitrile copolymer, and the like), the second polymer may be a cellulose derivative (cellulose esters such as cellulose acetate propionate), a (meth)acrylic resin (polymethyl methacrylate and the like), an alicyclic olefin resin (a polymer having norbornene as a monomer, and the like), a polycarbonate resin, a polyester resin (poly $C_{2-4}$alkylene arylate copolyester and the like, and the like), and the like.

Further, when the first polymer is a cellulose derivative (cellulose esters such as cellulose acetate propionate), the second polymer may be a styrene resin (polystyrene, a styrene-acrylonitrile copolymer, and the like), a (meth)acrylic resin, an alicyclic olefin resin (a polymer having norbornene as a monomer, and the like), a polycarbonate resin, a polyester resin (poly $C_{2-4}$alkylene arylate copolyester and the like), and the like.

The plurality of kinds of polymers may include at least cellulose esters (cellulose $C_{2-4}$alkylcarboxylates such as cellulose diacetate, cellulose triacetate, cellulose acetate propionate, and cellulose acetate butyrate).

Here, a precursor of the curable resin included in the plurality of resin components is cured by active energy rays (such as ultraviolet rays and electron beams) at the time of manufacturing the anti-glare layer 3, and thus the phase separation structure of the anti-glare layer 3 in the first embodiment is fixed. Further, with thee curable resin as described above, the anti-glare layer 3 in the first embodiment is provided with scratch resistance and durability.

From a perspective of achieving scratch resistance, at least one polymer included in the plurality of kinds of polymers is preferably a polymer having a functional group, which is reactable with a curable resin precursor, at a side chain. As the polymer forming the phase separation structure, a thermoplastic resin or other polymers may be included in addition to the two non-miscible polymers described above. A mass ratio M1/M2 of mass M1 of the first polymer to a mass M2 of the second polymer and a glass transfer temperature of the polymers can be set as appropriate.

As the curable resin precursor, for example, there can be exemplified a curable compound having a functional group that undergoes a reaction by active energy rays (such as ultraviolet rays and electron beams), heat, and the like and forming a resin (particularly, a cured resin or a crosslinked resin) by curing or crosslinking by the functional group.

Examples of the compound described above include a thermosetting compound or a thermosetting resin (a low molecular weight compound having an epoxy group, a polymerizable group, an isocyanate group, an alkoxysilyl group, a silanol group, and the like (for example, an epoxy resin, an unsaturated polyester resin, a urethane resin, and a silicone resin)), and a photocurable (ionizing radiation-curable) compound that is cured by ultraviolet rays, electron beams, or the like (an ultraviolet light curable compound such as photocurable monomer and oligomer).

As the preferable curable resin precursor, there can be exemplified a photocurable compound that is cured by ultraviolet rays, electron beams, or the like in a short period of time. Of those, the ultraviolet light curable compound is particularly practical. The photocurable compound preferably includes 2 or more (preferably about from 2 to 15 and more preferably about from 4 to 10) polymerizable unsaturated bonds in the molecule. Consequently, resistance such as scratch resistance can be improved. Specifically, the photocurable compound preferably is epoxy (meth)acrylate, urethane (meth)acrylate, polyester (meth)acrylate, silicone (meth)acrylate, and a polyfunctional monomer having at least two polymerizable unsaturated bonds.

The curable resin precursor may include a curing agent in accordance with a type thereof. For example, the thermosetting resin precursor may include a curing agent such as amines and polyhydric carboxylic acids, and the photocurable resin precursor may include a photopolymerization initiator. Examples of the photopolymerization initiator include the known components such as acetophenones or propiophenones, benzyls, benzoins, benzophenones, thioxanthones, and acylphosphine oxides.

Further, the curable resin precursor may include a curing accelerator. For example, the photocurable resin precursor may include a photocuring accelerator (for example, tertiary amines (such as dialkylaminobenzoic acid ester), and a phosphine photopolymerization accelerator.

When manufacturing the anti-glare layer 3 in the first embodiment, at least two components in the polymers included in the solution being the raw material of the anti-glare layer 3 and the curable resin precursor are used as a combination, which are phase-separated from each other at a temperature around a process temperature. Examples of the combination for phase separation include (a) a combination in which a plurality of kinds of non-miscible polymers are phase-separated from each other, (b) a combination in which a polymer and a curable resin precursor that are non-miscible are phase-separated from each other, (c) a combination in which a plurality of non-miscible curable resin precursors are phase-separated from each other. Of those combinations, in general, (a) a combination of a plurality of kinds of polymers, (b) a combination of a polymer and a curable resin precursor are generally conceived, and particularly, (a) a combination of a plurality of kinds of polymers is preferable.

Here, in general, the polymers and a cured resin generated by curing of the curable resin precursor or a crosslinked resin have refractive indexes different from each other. Further, in general, the plurality of kinds of polymers (the first polymer and the second polymer) have refractive indexes different from each other. A difference of the refractive indexes of the polymers and the cured resin or the crosslinked resin, and a difference of the refractive indexes of the plurality kinds of polymers (the first polymer and the second polymer) are preferably values falling within a range from 0 to 0.2, and more preferably values falling within a range from 0 to 0.07.

Further, the anti-glare layer 3 may include a plurality of fine particles (filler) dispersed in a matrix resin. The fine particle may be any of an organic fine particle or an inorganic fine particle, and the plurality of fine particles may include a plurality of kinds of fine particles.

As the organic fine particle, a crosslinked acrylic particle and a crosslinked styrene particle can be exemplified. Further, as the inorganic fine particle, a silica particle and an alumina particle can be exemplified. Further, as one example, a difference in refractive indexes of the fine particles and the matrix resin included in the anti-glare layer 3 may be set to a value falling within a range from 0 to 0.2. The difference in refractive indexes is further desirably a value falling within a range from 0 to 0.15, and more desirably a value falling within a range from 0 to 0.07.

An average particle diameter of the fine particles is not particularly limited, and can be set to a value falling a range of, for example, from 0.5 μm to 5.0 μm. The average particle diameter is further desirably a value falling within a range from 0.5 μm to 4.0 μm, and more desirably a value falling within a range from 1.0 μm to 3.0 μm.

Note that, the average particle diameter described herein is a 50%-volume average particle diameter in a coulter counter method (the same holds true in the average particle diameter mentioned below). The fine particle may be solid or hollow. When the average particle diameter of the fine particles is excessively small, anti-glare property is less likely to be obtained, and when the average particle diameter of the fine particles is excessively large, sparkle on a display is disadvantageously increased, which should be noted.

The thickness dimension of the anti-glare layer 3 in the first embodiment can be set as appropriate, and is desirably a value falling within a range, for example, from 0.3 μm to 20 μm, more desirably a value falling within a range from 1 μm to 15 μm, and more desirably a value falling within a range from 1 μm to 10 μm. In general, the thickness dimension can be set to a value falling within a range from 2 μm to 10 μm (particularly, a value falling within a range from 3 μm to 7 μm).

Note that, the anti-glare film 1 from which the substrate film 2 is omitted may be configured. In this case, the thickness dimension of the anti-glare layer 3 is desirably a value falling within a range from 1 μm to 100 μm, and more desirably a value falling within a range from 3 μm to 50 μm.

The anti-glare layer 3 in the first embodiment may include a known additive such as organic or inorganic particles, a stabilizer (antioxidant, an ultraviolet absorbing agent, and the like), a surfactant, a water soluble polymer, a filler, a crosslinker, a coupling agent, a coloring agent, a flame retardant, a lubricant, wax, an antiseptic, a viscosity adjusting agent, a thickening agent, a leveling agent, and an anti-foaming agent, as long as an optical property is not impaired.

As one example, a method of manufacturing the anti-glare film 1 according to the first embodiment includes preparing a solution being a raw material of the anti-glare layer 3 in the first embodiment (hereinafter, also referred to simply as the "solution"), forming a phase separation structure by spinodal decomposition from a liquid phase while coating a surface of a prescribed support body (the substrate film 2 in the first embodiment) with the solution prepared in preparing and evaporating a solvent in the solution, and curing a curable resin precursor after forming.

Preparing

During preparing, the solution including the solvent and a resin composition forming the anti-glare layer 3 in the first embodiment is prepared. The solvent may be selected in accordance with kinds and solubility of the polymers included in the anti-glare layer 3 described above and the curable resin precursor. The solvent is only required to dissolve uniformly at least solid contents (the plurality of kinds of polymers, the curable resin precursor, a reaction initiator, and an additive thereto).

Examples of the solvent include ketones (acetone, methyl ethyl ketone, methyl isobutyl ketone, cyclohexanone, and the like), ethers (dioxane, tetrahydrofuran, and the like), aliphatic hydrocarbons (hexane and the like), alicyclic hydrocarbons (cyclohexane and the like), aromatic hydrocarbons (toluene, xylene, and the like), halogenated carbons (dichloromethane, dichloroethane, and the like), esters (methyl acetate, ethyl acetate, butyl acetate, and the like), water, alcohols (ethanol, isopropanol, butanol, cyclohexanol, and the like), cellosolves (methyl cellosolve, ethyl cellosolve, and the like), cellosolve acetates, sulfoxides (dimethyl sulfoxide and the like), amides (dimethylformamide, dimethylacetamide, and the like). In addition, the solvent may be a mixed solvent.

As the resin composition, a thermoplastic resin, a photocurable compound, a photopolymerization initiator, and a composition including a thermoplastic resin and a photocurable compound are desired. Alternatively, as the resin composition, a composition including the plurality of kinds of non-miscible polymers, a photocurable compound, and the photopolymerization initiator is desired.

A concentration of solutes (the polymers, the curable resin precursor, the reaction initiator, and the other additive) in the liquid mixture can be adjusted as long as the phase separation of the plurality of resin components is caused and a flow-casting property, a coating property, and the like are not impaired.

Forming

During forming, the solution prepared in preparing is flow-casted on or coats the surface of the support body (here, as one example, the substrate film 2). Examples of the flow-casting method or the coating method of the solution include the known method such as a spray, a spinner, a roll coater, an air knife coater, a blade coater, a rod coater, a reverse coater, a bar coater, a comma coater, a dip, a dip squeeze coater, a die coater, a gravure coater, a micro gravure coater, and a silk screen coater.

The solvent is evaporated and removed through drying from the solution which is flow-casted on or coats the surface of the support body. Along with condensation of the solution during evaporation, the phase separation of the plurality of resin components by spinodal decomposition from a liquid phase is caused, and a phase separation structure with a relatively regular inter-phase distance (a pitch or a mesh diameter) is formed. A co-continuous phase structure of the long and slender protruding parts can be formed by setting a drying condition and formulation that increase melt flowability of the resin components after evaporation of the solvent to some extent.

Evaporation of the solvent is preferably performed by heating and drying because the long and slender protruding parts are easily formed on the surface of the anti-glare layer 3 in the first embodiment. When a drying temperature is excessively low or a drying time period is excessively short, a quantity of heat is insufficiently provided to the resin components. Thus, melt flowability of the resin components is degraded, and the long and slender protruding parts are hard to be formed, which should be noted.

In contrast, when the drying temperature is excessively high or the drying time period is excessively long, the long and slender protruding parts that have been formed flow and reduce in height in some cases, although the structure thereof is maintained. Thus, in addition to adjustment of a combination of the phase-separation materials, the sparkle value, the specular gloss, the transmission image clarity, and the haze value of the anti-glare layer 3, which are set to values falling within ranges that satisfy the above-mentioned conditions, can be achieved by adjusting the drying temperature and the drying time period, and adjusting the height of the long and slender protruding parts or the like. Further, during forming, by increasing an evaporation temperature of the solvent or using components having a low viscosity as the resin components, a co-continuous phase structure in which phase separation structures are connected can be provided.

As the phase separation of the plurality of resin components by spinodal decomposition from a liquid phase advances, a co-continuous phase structure is formed and coarsened. Consequently, the continuous phase becomes a non-continuous phase, and a liquid droplet phase structure (an isolated-phase sea-island structure in a ball-like shape, a spherical shape, a disk-like shape, an oval shape, or the like) is formed. Here, depending on an extent of the phase separation, an intermediate structure between a co-continuous phase structure and a liquid droplet structure (a phase structure in a process of shifting the co-continuous phase to the liquid droplet phase) can also be formed. After the solvent is removed, a layer with a surface having fine recesses and protrusions is formed.

Curing

During curing, the curable resin precursor included in the solution is cured, and hence the phase separation structure formed in forming is fixed. As a result, the anti-glare layer 3 in the first embodiment is formed. Curing of the curable resin precursor can be performed by heating, irradiation with active energy rays, or a combination of these methods in accordance with a kind of the curable resin precursor. The active energy rays for irradiation are selected in accordance with a kind of a photocuring component or the like.

As needed, the irradiation of the active energy rays may be performed in an inert gas atmosphere. When the active energy rays are ultraviolet rays, a far ultraviolet light lamp, a low-pressure mercury lamp, a high-pressure mercury lamp, an ultrahigh-pressure mercury lamp, a halogen lamp, a laser light source (a helium-cadmium laser, an excimer laser, and the like), and the like may be used as the light source.

Note that, when the adhesive layer 4 is formed, a solution including an adhesive component is adjusted, and then the solution coats the other surface of the substrate film 2 and is dried by the known method such as the flow-casting method or the coating method described above in forming. With this, formation can be completed.

With the procedures as described above, the anti-glare film 1 according to the first embodiment is manufactured. Note that, when a peelable support body is used as the support body, the anti-glare film 1 formed of only the anti-glare layer 3 can be obtained by peeling the anti-glare layer 3 from the support body. Further, when a non-peelable support body (preferably, a transparent support body such as the substrate film 2) is used as the support body, the anti-glare film 1 having a layered structure including the support body (the substrate film 2) and the anti-glare layer 3 can be obtained.

Here, as a method of suppressing sparkle of the display 16a, for example, it is conceivable to reduce the recesses and protrusions on the surface of the anti-glare layer 3. However, there may be a possibility of degradation of anti-glare property of the anti-glare film 1. However, in addition to reduction of the recesses and protrusions on the anti-glare layer 3, the inclination of the recesses and protrusions on the anti-glare layer 3 is increased to make the recesses and protrusions steep, and the number of recesses and protrusions is increased. Consequently, anti-glare property can be improved while suppressing sparkle on the display.

The recesses and protrusions described above can be formed on the anti-glare layer 3 by the above-mentioned spinodal decomposition in the first embodiment. However, with other methods, the recesses and protrusions described above can also be formed on the anti-glare layer 3. For example, in a case where a plurality of fine particles are used for forming recesses and protrusions on the surface of the anti-glare layer 3 as in the second embodiment, materials are selected, and thus a repulsive interaction between the fine particles, and a resin or a solvent other than the fine particles is strong at the time of forming the anti-glare layer 3. Consequently, suitable aggregation of the fine particles is caused, and a distribution structure of steep recesses and protrusions with high number density can be formed on the anti-glare layer 3. Thus, in the following, the anti-glare layers 3 in the other embodiments are described by mainly focusing on differences from the first embodiment.

Now, the anti-glare layers 3 in the other embodiments (the second embodiment and the third embodiment) are described.

Second Embodiment

The anti-glare layer 3 in the second embodiment includes a matrix resin and a plurality of fine particles dispersed in the matrix resin. The plurality of fine particles are formed in a spherical shape. However, the plurality of particles are not limited thereto, and may be formed in a substantially ball-like shape or an oval shape. Further, the fine particle is formed to be solid, but may be formed to be hollow. When the fine particle is formed to be hollow, in a hollow part of the fine particle may be filled with air or other gases. In the anti-glare layer 3 in the second embodiment, the fine particles may be dispersed as primary particles, or a plurality of secondary particles formed by aggregation of a plurality of fine particles may be dispersed.

A difference in refractive indexes of the matrix resin and the fine particles is set to a value falling within a range from 0 to 0.2. The difference in refractive indexes is further desirably a value falling within a range from 0 to 0.15, and more desirably a value falling within a range from 0 to 0.07.

The fine particles have an average particle diameter set to a value falling within a range of from 0.5 μm to 5.0 μm. The average particle diameter of the fine particles is further desirably a value falling within a range from 0.5 μm to 4.0 μm, and more preferably a value falling within a range from 1.0 μm to 3.0 μm.

Further, variation in particle diameter of the fine particles is preferably small. For example, in particle diameter distribution of the fine particles included in the anti-glare layer 3, an average particle diameter of 50 wt. % or greater of the fine particles included in the anti-glare layer 3 preferably has variation within 1.0 μm.

As described above, uniform and suitable recesses and protrusions are formed on the surface of the anti-glare layer 3 due to the fine particles having a relatively uniform particle diameter and the average particle diameter set to fall within the above-mentioned range. With this, sparkle on the display 16a can be suppressed while securing anti-glare property.

Further, the weight of the matrix resin and the total weight of the plurality of fine particles in the anti-glare layer 3 can be set as appropriate. In the second embodiment, a ratio G2/G1 of a weight G1 of the matrix resin of the anti-glare layer 3 to a total weight G2 of the plurality of fine particles included in the anti-glare layer 3 is set to a value falling within a range from 0.02 to 0.15. The ratio G2/G1 is preferably a value falling within a range from 0.04 to 0.15, and more preferably a value falling within a range from 0.04 to 0.12.

The fine particles dispersed in the matrix resin may be inorganic or organic, and preferably have satisfactory transparency. As the organic fine particles, plastic beads can be exemplified. Examples of the plastic beads include styrene beads (a refractive index of 1.59), melamine beads (a refractive index of 1.57), acrylic beads (a refractive index of 1.49), acryl-styrene beads (a refractive index of 1.54), polycarbonate beads, polyethylene beads, and the like. The plastic beads desirably have hydrophobic groups on surfaces thereof. As the plastic beads, styrene beads can be exemplified.

As the matrix resin, at least any of a photocurable resin cured by active energy rays, a solvent drying-type resin cured by drying the solvent added during coating, or the thermosetting resin can be exemplified.

Examples of the photocurable resin include a resin having a acrylate functional group such as a polyester resin with a relatively low molecular weight, a polyether resin, an acrylic resin, an epoxy resin, an urethane resin, an alkyd resin, a spiroacetal re sin, a polybutadiene resin, a polythiol polyene resin, an oligomer such as a (meth)acrylate which is a polyfunctional compound such as polyhydric alcohol, a prepolymer, and a reactive diluent.

Specific examples of those include a monofunctional monomer and a polyfunctional monomer of, for example, ethyl (meth)acrylate, ethylhexyl (meth)acrylate, styrene, methyl styrene, N-vinyl pyrrolidone, such as polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When the photocurable resin is an ultraviolet light curable resin, it is preferred to use the photopolymerization initiator. Examples of the photopolymerization initiator include acetophenones, benzophenones, Michler benzoyl benzoate, α-amyl oxime ester, tetramethylthiuram monosulfide, and thioxanthones. Further, the photocurable resin is preferably used by mixing with a photosensitizer. As the photosensitizer, n-butylamine, triethylamine, poly-n-butylphosphine, and the like can be exemplified.

As the solvent drying-type resin, a publicly known thermoplastic resin can be exemplified. Examples of the thermoplastic resin include a styrene resin, a (meth)acrylate-based resin, a vinyl acetate-based resin, a vinyl ether resin, a halogen-containing resin, an alicyclic olefin resin, a polycarbonate resin, a polyester resin, a polyamide resin, a cellulose derivative, a silicone resin, rubber or elastomer, and the like.

As the solvent drying-type resin, a resin, which can be solved in an organic solvent, and is excellent particularly in moldability, film-formability, transparency, and weather resistance, is desired. Examples of the solvent drying-type resin as described above include a styrene resin, a (meth) acrylate-based resin, an alicyclic olefin resin, a polyester resin, and a cellulose derivative (cellulose esters and the like).

Here, when the material of the substrate film 2 is a cellulose resin such as cellulose triacetate (TAC), a cellulose resin can be exemplified as a thermoplastic resin used as the solvent drying-type resin. Examples of the cellulose resin include a cellulose derivative such as cellulose nitrate, acetyl cellulose, acetyl butyl cellulose, ethyl cellulose, methyl cellulose, cellulose acetate propionate, and ethyl hydroxyethyl cellulose. A cellulose resin is used as the solvent drying-type resin, and thus the substrate film 2 and the anti-glare layer 3 can be brought into close contact with each other satisfactorily. Also, excellent transparency can be obtained in the anti-glare film 1.

Further, other than the above, examples of the solvent drying-type resin include a vinyl resin, an acetal resin, an acrylate-based resin, a polystyrene resin, a polyamide resin, and a polycarbonate resin.

Examples of the thermosetting resin include a phenol resin, a urea resin, a diallyl phthalate resin, a melamine resin, a guanamine resin, an unsaturated polyester resin, a polyurethane resin, an epoxy resin, an aminoalkyd resin, a melamine-urea co-condensated resin, a silicone resin, and a polysiloxane resin When the thermosetting resin is used as the matrix resin, at least any of a crosslinker, a curing agent such as a photopolymerization initiator, a photopolymerization accelerator, a solvent, and a viscosity adjusting agent or the like may be used in combination.

As one example, a method of manufacturing the anti-glare film 1 according to the second embodiment includes preparing a solution being a raw material of the anti-glare layer 3 in the second embodiment, coating a surface of a prescribed support body (the substrate film 2 in the second embodiment) with the solution prepared in preparing, and curing a resin in the solution used for coating.

Preparing

During preparing, the solution including the solvent, and a resin composition and fine particles for forming the anti-glare layer 3 in the second embodiment is prepared. As the solvent, at least any of alcohols (such as isopropyl alcohol, methanol, and ethanol), ketones (such as methyl ethyl ketone (MEK), methyl isobutyl ketone (MIBK), and cyclohexanone), esters (such as methyl acetate, ethyl acetate, and butyl acetate), halogenated hydrocarbon, or aromatic hydrocarbon (such as toluene and xylene) can be exemplified. A publicly known leveling agent may further be added to solution. For example, by using a fluorine or silicone leveling agent, satisfactory scratch resistance can be provided to the anti-glare layer.

Coating and Curing

During coating, the solution prepared in preparing is flow-casted on or coats the surface of the support body (here, as one example, the substrate film 2) by a method similar to that in the first embodiment. The solvent is evaporated and removed through drying from the solution which is flow-casted on or coats the surface of the support body.

When the matrix resin is a photocurable resin, as one example, curing by ultraviolet light or electron beams is performed after coating. As the ultraviolet light source, a light source such as various types of mercury lamps, an ultraviolet ray carbon arc lamp, black light, and a metal halide lamp can be exemplified. Further, as a wavelength region of the ultraviolet light, for example, a wavelength region from 190 nm to 380 nm can be exemplified.

Further, as an electron beam source, a publicly known electron beam accelerator can be exemplified. Specifically, various electron beam accelerators such as a Van de Graaff type, a Cockcroft-Walton type, a resonant transformer type, an insulating core transformer type, a linear type, a dynamitron type, and a high-frequency type can be exemplified.

The matrix resin included in the solution is cured, and hence the positions of the fine particles in the matrix resin are fixed. Consequently, the plurality of fine particles are dispersed in the matrix resin, and the anti-glare layer having a structure in which the recesses and protrusions are formed on the surface due to the fine particles is formed.

In the anti-glare film 1 according to the second embodiment, a difference in refractive indexes of the matrix resin and the fine particles is set to fall within a predetermined range, and the plurality of fine particles are dispersed in the matrix resin. Consequently, sparkle on the display 16a can be suppressed while securing satisfactory anti-glare property.

Third Embodiment

The anti-glare layer 3 of the anti-glare film 1 according to the third embodiment has a structure in which recesses and protrusions are shaped on a surface on a side opposite to the substrate film 2 side. The anti-glare layer 3 in the third embodiment is formed of a resin layer. The resin layer is formed of the same material as that of the matrix resin included in the anti-glare layer 3 in the second embodiment, as one example.

Figure 2:
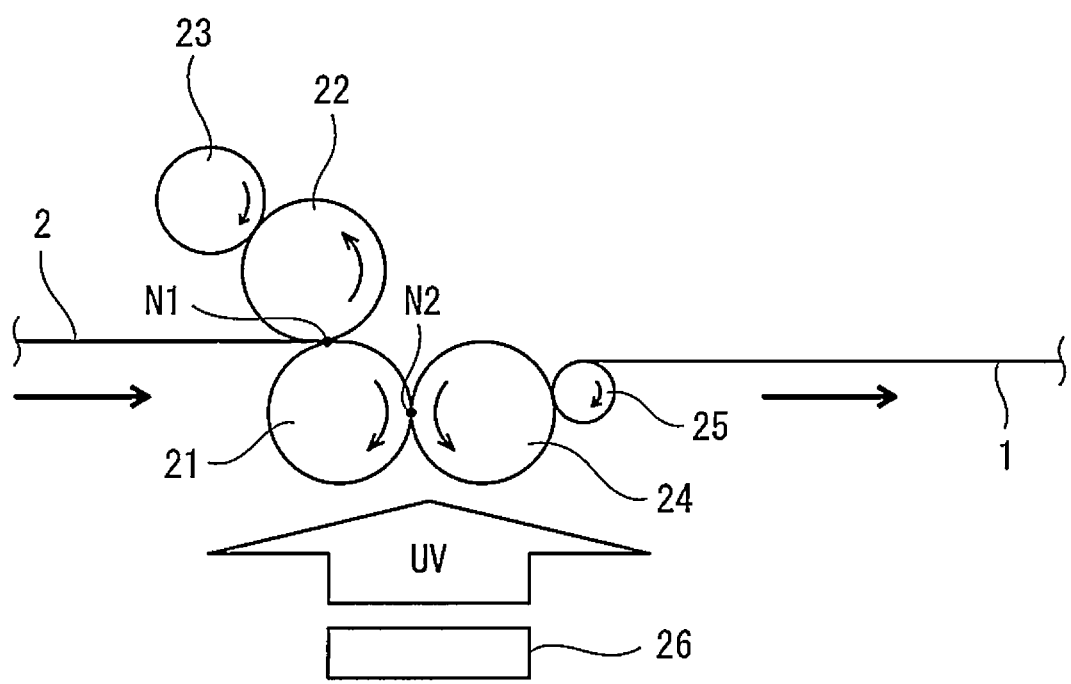
FIG. 2 is a view illustrating a method of manufacturing an anti-glare film according to a third embodiment.

As one example, the anti-glare film 1 according to the third embodiment is manufactured by forming a coat layer formed of a curable resin on the substrate film 2, shaping a surface of the coat layer into recesses and protrusions, and curing the coat layer. FIG. 2 is a view illustrating a method of manufacturing the anti-glare film 1 according to the third embodiment. In the example of FIG. 2, an ultraviolet light curable resin is used as a curable resin.

As illustrated in FIG. 2, in this manufacturing method, the substrate film 2 is unwound from an unwind roll (not shown), and is conveyed in a predetermined direction. A downstream end of the substrate film 2 in a conveyance direction is inserted to a nip point N1 of a pair of rolls 21 and 22.

An ultraviolet light curable resin precursor adheres to a circumferential surface of the roll 22 from a circumferential surface of a roll 23 that is adjacent to and axially supported by the roll 22. The substrate film 2 passes through the nip point N1, the ultraviolet light curable resin precursor coats one surface of the substrate film 2.

A layer of the ultraviolet light curable resin precursor coating the substrate film 2 (hereinafter, referred to as a coat layer) is pressed together with the substrate film 2 at a nip point of rolls 21 and 24. The roll 24 is a roll-shaped die (an embossing roll) with fine recesses and protrusions formed on a circumferential surface thereof, and transfers the recesses and protrusions onto a surface of the coat layer when passing though the nip point N2 of the rolls 21 and 24.

The coat layer onto which the recesses and protrusions are transferred from the roll 24 is cured by ultraviolet light emitted from a ultraviolet light lamp 26 provided below the rolls 21 and 24. Consequently, the anti-glare layer 3 of the anti-glare film 1 according to the third embodiment is formed. The anti-glare film 1 according to the third embodiment thus manufactured is released from the roll 24 and conveyed in a predetermined direction by a roll 25 that is adjacent to and axially supported by the roll 24.

Here, the recesses and protrusions on the surface of the roll 24 are formed through blasting by causing blast particles having a predetermined particle diameter to strike, and a shape of the recesses and protrusions formed on the coat layer of the anti-glare film 1 can be adjusted by adjusting a blast particle diameter.

As the substrate film 2 of the anti-glare film 1 according to the third embodiment, a polyethylene terephthalate (PET) film, a cellulose triacetate (TAC) film, a cyclo olefin polymer (COP) film, an acrylic resin film, or a polycarbonate resin film can suitably be used.

As described above, the method of manufacturing the anti-glare film 1 according to the third embodiment includes (a) coating the substrate film 2 with the curable resin precursor, (b) manufacturing the roll-shaped die having recesses and protrusions on the surface thereof by causing the blast particles to strike, (c) transferring the recesses and protrusions onto the surface of the curable resin precursor that coats the substrate film 2, through use of the roll-shaped die, and (d) forming the anti-glare layer 3 having the surface with the recesses and protrusions formed thereon by curing the curable resin precursor onto which the recesses and protrusions are transferred.

The average particle diameter of the blast particles used in (b) can be set as appropriate, and can be set to a value falling within a range of from 10 μm to 50 μm, as one example. The average particle diameter of the blast particles is further desirably a value falling within a range from 20 μm to 45 μm, and more desirably a value falling within a range from 30 μm to 40 μm. Consequently, the anti-glare layer 3 in the third embodiment having a surface with the recesses and protrusions shaped thereon can be obtained.

Note that, the die used in the third embodiment may be other than the roll-shaped die, and may be a plate-shaped die (an embossing plate), for example. Further, a coat layer (a resin layer) is formed on one surface of the substrate film 2 in the third embodiment, and then the surface of the coat layer is shaped by the die. In this manner, the anti-glare layer 3 in the third embodiment may be formed. Further, in the example described above, the coat layer is cured after the surface of the coat layer is shaped. However, shaping and curing of the coat layer may be performed in parallel.

As one example of a material of the die, metal, plastic, and wood can be exemplified. A coating film may be provided on a contact surface of the die with the coat layer, and thus durability (wear resistance) of the die is improved. As one example of a material of the blast particles, metal, silica, alumina, and glass can be exemplified. The blast particles can be caused to strike against the surface of the die by, for example, a pressure force of air or liquid. Further, when the curable resin precursor is an electron beam curable type, an electron beam source such as an electron beam accelerator can be used in place of the ultraviolet light lamp 26. When the curable resin precursor is a thermosetting type, a heat source such as a heater can be used in place of the ultraviolet light lamp 26.

Note that, the anti-glare layer 3 of the anti-glare film 1 according to each of the embodiments described above may further include an upper layer arranged on the surface on the side opposite to the substrate film 2 side. By providing the upper layer, an external haze of the anti-glare layer 3 can be adjusted easily. Moreover, the anti-glare film 1 can be protected easily from outside.

A thickness of the upper layer can be set as appropriate, and can be set to a value falling within a range, for example, from 10 nm to 2.0 μm. The thickness of the upper layer is further desirably a value falling within a range from 50 nm to 1.0 μm, and more desirably a value falling within a range of from 70 nm to 0.5 μm.

Next, an evaluation device and an evaluation method for quantitatively evaluating sparkle on the anti-glare film 1 according to each of the embodiments described above are described with reference to FIG. 3.

Sparkle Measurement Apparatus

FIG. 3 is a view illustrating one example of a schematic configuration of the sparkle measurement apparatus 10 according to an embodiment of the present invention. The sparkle measurement apparatus 10 is an apparatus that inspects an extent of sparkle on the display 16a of the display device 16 on which the anti-glare film 1 is attached. The sparkle measurement apparatus 10 includes an enclosure 11, an imaging device 12, a holding portion (adjusting portion) 13, an imaging device stand 14, a display device stand (adjusting portion) 15, and an image processing device 17.

The enclosure 11 is for providing a dark space being a measurement space for performing sparkle evaluation, and has a hollow rectangular parallelepiped shape. The imaging device 12, the holding portion 13, the imaging device stand 14, the image display stand 15, and the display device 16 being subjected to sparkle evaluation are housed in the enclosure 11. Note that, the enclosure 11 has a configuration that prevents light from entering the enclosure 11 from outside at the time of imaging performed by the imaging device 12.

As one example, the imaging device 12 is an area camera including a lens 18 and an imaging element, and captures an image of an image displayed on the display 16a. The imaging device 12 is held by the holding portion 13, and thus the lens 18 and the display 16a face with each other. The imaging device 12 is connected to the image processing device 17, and image data captured by the imaging device 12 is transmitted to the image processing device 17.

The holding portion 13 is a member in a bar-like shape extending in a vertical direction (in an up-and-down direction in FIG. 3). The base end of the holding portion 13 is fixed by the imaging device stand 14, and the distal end thereof holds the imaging device 12. Further, the imaging device 12 is movable in the vertical direction by the holding portion 13, and a relative distance between the display 16a and the lens 18 can be changed.

The display device 16 is placed on the upper surface of the image display stand 15 under a state in which the display 16a with the anti-glare film 1 attached thereon faces the imaging device 12. The image display stand 15 can support the display device 16, and thus the surface of the display 16a with the anti-glare film 1 attached thereon faces the imaging device 12 and becomes a horizontal surface. The image display stand 15 can move the display device 16 in the vertical direction, and thus a relative distance between the display 16a and the lens 18 is changed.

In the sparkle measurement apparatus 10, by adjusting a relative distance between the imaging device 12 and the display 16a, a size of an image displayed in the display 16a, which is captured as an image by the imaging element of the imaging device 12, is adjusted. In other words, a pixel size of the image displayed on the display 16a, which is captured by the imaging element of the imaging device 12 per unit pixel (for example, one pixel), is adjusted.

The image processing device 17 executes data processing of the image data captured by the imaging device 12. Specifically, the image processing device 17 obtains, from the image data captured by the imaging device 12, a value of a standard deviation of luminance of the image displayed on the display 16a.

the image processing device 17 in the present embodiment includes an input unit to which the image data captured by the imaging device 12 is input, an image processing unit that subjects the input image data to image processing, an output unit that outputs a result obtained by processing of the image processing unit to a display instrument, a printing device, or the like (not shown), and the like.

Note that, as the method of adjusting a pixel size of the image displayed on the display 16a, which is captured by the imaging element per unit pixel (for example, one pixel), a method of varying a focal length of the imaging device 12 may be adopted when the lens 18 included in the imaging device 12 is a zoom lens, in addition to the method of varying a relative distance between the imaging device 12 and the display 16a.

Sparkle Evaluation Method

Next, a sparkle evaluation method through use of the sparkle measurement apparatus 10 is described. In this sparkle evaluation method, for convenience of the evaluation, display is performed on the display 16a having a surface on which the anti-glare film 1 is attached while the surface is caused to emit one-color light evenly (green as one example) in advance.

First, adjustment is performed, and thus a pixel size of the display 16a with the anti-glare film 1 attached thereon, which is captured by the imaging element of the imaging device 12 per unit pixel, is set to a predetermined value (adjusting).

At the time of adjusting, a relative distance between the imaging device 12 and the display 16a with the anti-glare film 1 attached thereon is adjusted in accordance with the number of effective pixels of the imaging element of the imaging device 12. Emission lines of the pixels of the image displayed on the display 16a with the anti-glare film 1 attached thereon are adjusted to be invisible or visible to an extent that does not affect sparkle evaluation in the image data captured by the imaging device 12.

Note that, a relative distance between the imaging device 12 and the display device 16 is desirably set in consideration of an actual usage mode of the display device 16 (for example, a relative distance between eyes of a user and the display 16a).

After adjusting is performed, a measurement area for evaluating sparkle on the display 16a with the anti-glare film 1 attached thereon is set (setting). At the time of setting, the measurement area can be set as appropriate in accordance with, for example, a size of the display 16a.

After adjusting is performed, the measurement area of the display 16a with the anti-glare film 1 attached thereon is captured as an image by the imaging device 12 (imaging). In this case, as one example, at least one of an exposure time of the imaging device 12 or luminance of all the pixels of the display 16a is adjusted, and thus image data relating to a gray scale image with 8-bit gradation display and an average luminance of 170 tones is obtained. At the time of imaging, the captured image data is input to the image processing device 17.

After imaging is performed, the image processing device 17 obtains, from the image data, a deviation of luminance of the image in the measurement area of the display 16a with the anti-glare film 1 attached thereon (calculating). At the time of calculating, a deviation of luminance can be expressed in a numerical form by obtaining a standard deviation of luminance distribution. Here, a sparkle degree of the display 16a with the anti-glare film 1 attached thereon is larger as a deviation of luminance of the display 16a with the anti-glare film 1 attached thereon is larger. Based on this, it can be quantitatively and objectively evaluated that a smaller value of a standard deviation of luminance distribution indicates less sparkle. Further, at the time of adjusting, the emission lines of the display 16a with the anti-glare film 1 attached thereon are adjusted to an extent that does not affect sparkle evaluation. Thus, luminance unevenness due to the emission lines is suppressed, and accurate sparkle evaluation can be performed.

With the procedures as described above, a standard deviation of luminance distribution of the display 16a having a surface with the anti-glare film 1 attached thereon can be obtained, and sparkle evaluation can be performed based on a magnitude of the value.

EXAMPLES AND COMPARATIVE EXAMPLES

Hereinafter, the present invention is described in more detail based on Examples, but the present invention is not limited to these Examples.

Each of Examples 1 to 3 is one example of the anti-glare film 1 that was manufactured by the phase separation method and satisfied the conditions of the sparkle value falling within a range of from 6 to 10, the specular gloss (60-degree gloss) of 30% or less, the transmission image clarity (image clarity) of 60% or less, which had an optical comb width of 0.5 mm, and the haze value of 50% or less. In other words, each of Examples 1 to 3 is one example of the anti-glare film 1 that was capable of satisfying the above-mentioned conditions with the recesses and protrusions formed on the surface of the anti-glare film 1 by the phase separation method.

Example 4 is one example of the anti-glare film 1 that was manufactured by the fine particle dispersion method and satisfied the conditions of the sparkle value falling within a range from 6 to 10, the specular gloss (60-degree gloss) of 30% or less, the transmission image clarity (image clarity) of 60% or less, which had an optical comb width of 0.5 mm, and the haze value of 50% or less. In other words, a difference of refractive indexes of the matrix resin of the anti-glare layer 3 of the anti-glare film 1 and the plurality of fine particles dispersed in the matrix resin was adjusted to 0.07 or less, and thus Example 4 is one example of the anti-glare film 1 capable of satisfying the above-mentioned conditions.

In contrast, each of Comparative Examples 1 to 3 is one example of the anti-glare film 1 manufactured by the fine particle dispersion method, and each of Comparative Examples 4 and 5 is one example of the anti-glare film 1 manufactured by the transfer forming method.

Raw Material

The raw materials used in Examples and Comparative Examples are as follows. Note that, with respect to raw materials that are cured by crosslinking, the refractive indexes thereof described below indicate refractive indexes after crosslinking (after curing).

Acrylate-based polymer having a polymerizable group: "Cyclomer P" available from Daicel-Allnex Ltd., (a refractive index of 1.51).

Cellulose acetate propionate: "CAP-482-20" available from Eastman Chemical Company, (a refractive index of 1.49), degree of acetylation=2.5%, degree of propionylation=46%, number average molecular weight of 75000 in terms of polystyrene.

Nanosilica (a refractive index of 1.46)-containing acrylate-based ultraviolet light curable compound: "UVHC7800G" available from Momentive Performance Materials Japan LLC., (a refractive index of 1.52).

Silicone acrylate: "EB1360" available from Daicel-Allnex Ltd., (a refractive index of 1.52).

Urethane acrylate: "UA-53H" available from Shin-Nakamura Chemical Co., Ltd., (a refractive index of 1.52).

Dipentaerythritol hexaacrylate: "DPHA" available from Daicel-Allnex Ltd., (a refractive index of 1.52).

Pentaerythritol tetraacrylate: "PETRA" available from Daicel-Allnex Ltd., (a refractive index of 1.52).

Silica (a refractive index of 1.46)-containing acrylated-based ultraviolet light curable compound: "Z-757-4RL" available from Aica Kogyo Company, Limited, (a refractive index of 1.52).

Fluorine compound having a polymerizable group: fluorine anti-fouling additive "KY-1203" available from Shin-Etsu Chemical Co., Ltd.

Alkylfenon photopolymerization initiator (photopolymerization initiator A): "IRGACURE 184" available from BASF SE.

Alkylfenon photopolymerization initiator (photopolymerization initiator B): "IRGACURE 907" available from BASF SE.

Polyethylene terephthalate (PET) film: "Diafoil" available from Mitsubishi Plastics, Inc.

Cellulose triacetate (TAC) film: "FUJITACTG60UL" available from FUJIFILM Corporation.

Example 1

50 parts by mass of an acrylate-based polymer having a polymerizable group, 4 parts by mass of cellulose acetate propionate, 76 parts by mass of urethane acrylate, 1 part by mass of silicone acrylate, 1 part by mass of the photopolymerization initiator A, and 1 part by mass of the photopolymerization initiator B were dissolved in a solvent obtained by mixing 176 parts by mass of methyl ethyl ketone and 28 parts by mass of 1-butanol, and thus a solution was prepared.

The solution was flow-casted on a PET film (the substrate film 2) using a wire bar (#18), and then was left in an oven at 80° C. for 1 minute to evaporate a solvent and form a coat layer having a thickness of approximately 9 μm. Further, for example, ultraviolet light curing processing of the coat layer was performed by irradiating the coat layer with ultraviolet light from an ultraviolet light lamp such as a high-pressure mercury lamp for approximately five seconds. In this manner, the anti-glare layer 3 was formed, and thus an anti-glare film of Example 1 was obtained.

Example 2

50 parts by mass of an acrylate-based polymer having a polymerizable group, 4 parts by mass of cellulose acetate propionate, 76 parts by mass of urethane acrylate, 1 part by mass of silicone acrylate, 1 part by mass of a fluorine compound having a polymerizable group, 1 part by mass of the photopolymerization initiator A, 1 part by mass of the photopolymerization initiator B were dissolved in a solvent obtained by mixing 176 parts by mass of methyl ethyl ketone and 28 parts by mass of 1-butanol, and thus a solution was prepared.

The solution was flow-casted on a PET film (the substrate film 2) using a wire bar (#14), and then was left in an oven at 80° C. for 1 minute to evaporate a solvent and form a coat layer having a thickness of approximately 6 μm. Further, ultraviolet light curing processing of the coat layer was performed by irradiating the coat layer with ultraviolet light from an ultraviolet light lamp for approximately five seconds. In this manner, the anti-glare layer 3 was formed, and thus an anti-glare film of Example 2 was obtained.

Example 3

17.5 parts by mass of acrylate-based polymer having a polymerizable group, 3.0 parts by mass of cellulose acetate propionate, 149.7 parts by mass of a nanosilica-containing acrylate-based ultraviolet light curable compound, 0.2 part by mass of silicone acrylate, 1 part by mass of the photopolymerization initiator A, and 1 part by mass of the photopolymerization initiator B were dissolved in a solvent obtained by mixing 129 parts by mass of methyl ethyl ketone, 24 parts by mass of 1-butanol, and 13 parts by mass of 1-methoxy-2-propanol, and thus a solution was prepared.

The solution was flow-casted on a TAC film (the substrate film 2) using a wire bar (#12), and then was left in an oven at 80° C. for 1 minute to evaporate a solvent and form a coat layer having a thickness of approximately 4 μm. Further, ultraviolet light curing processing was performed by irradiating the coat layer with ultraviolet light from an ultraviolet light lamp for approximately five seconds. In this manner, the anti-glare layer 3 was formed, and thus an anti-glare film of Example 3 was obtained.

Example 4

A solution was prepared by mixing 50 parts by mass of a silica (a refractive index of 1.46)-containing acrylate-based ultraviolet light curable compound (a refractive index of 1.52) and 50 parts by mass of 1-butanol.

The solution was flow-casted on a PET film (the substrate film 2) using a wire bar (#16), and then was left in an oven at 80° C. for 1 minute to evaporate a solvent and form a coat layer having a thickness of approximately 7 μm. Further, ultraviolet light curing processing was performed by irradiating the coat layer with ultraviolet light from an ultraviolet light lamp for approximately five seconds. In this manner, the anti-glare layer 3 was formed, and thus an anti-glare film of Example 4 was obtained. Note that, when G1 indicated the weight of the matrix resin (acrylate-based ultraviolet light curable compound) and G2 indicated a weight of the fine particles (silica) included in the anti-glare layer 3, the ratio G2/G1 of those weights was 0.14.

Comparative Example 1

As the transparent base material, triacetyl cellulose (available from FUJIFILM Corporation, a thickness of 80 μm) was prepared.

Pentaerythritol triacrylate ("PETA" available from Daicel-Allnex Ltd., a refractive index of 1.51) was used as a transparent resin. Then, with respect to 100 parts by mass of the transparent resin, 10.0 parts by mass of styrene-acrylic copolymer particles (a refractive index of 1.51, an average particle diameter of 9.0 μm) and 16.5 parts by mass of polystyrene particles (a refractive index of 1.60, an average particle diameter of 3.5 μm) were included as transparent particles. Then, 190 parts by mass of a mixed solvent of toluene (a boiling point at 110° C.) and cyclohexanone (a boiling point at 156° C.) in a mass ratio of 7:3 are mixed with 100 parts by mass of the transparent resin. As a result, a resin composition was obtained.

The resin composition was applied on the transparent base, and was dried for one minute while purging drying air at a flow speed of 1 m/s at 85° C. Note that, the coating thickness is 5 μm. After that, UV light curing processing was performed by irradiating a transparent resin with ultraviolet light from an ultraviolet light lamp (200 mJ/cm$^2$ in a nitrogen atmosphere). In this manner, the anti-glare layer 3 was formed, and thus an anti-glare film of Comparative Example 1 was obtained.

Comparative Example 2

As the transparent base material, triacetyl cellulose (available from FUJIFILM Corporation, a thickness of 80 μm) was prepared.

A mixture of pentaerythritol triacrylate ("PETA" available from Daicel-Allnex Ltd.), dipentaerythritol hexaacrylate ("DPHA" available from Daicel-Allnex Ltd.), and polymethyl methacrylate ("BR85" available from MITSUBISHI RAYON CO., LTD.) was used as a transparent resin (a mass ratio of PETA/DPHA/PMMA=86/5/9) (a refractive index of 1.51). Then, with respect to 100 parts by mass of the transparent resin, 18.5 parts by mass of polystyrene particles (a refractive index of 1.60, an average particle diameter of 3.5 μm) and 3.5 parts by mass of styrene-acrylic copolymer particles (a refractive index of 1.56, and average particle diameter of 3.5 μm) were included as transparent particles. Then, 190 parts by mass of a mixed solvent of toluene (a boiling point at 110° C.) and cyclohexanone (a boiling point at 156° C.) in a mass ratio of 7:3 are mixed with 100 parts by mass of the transparent resin. As a result, a resin composition was obtained.

The resin composition was applied on the transparent base, and was dried for one minute while purging drying air at a flow speed of 0.2 m/s at 70° C. Note that, the coating thickness is 3.5 μm. After that, UV light curing processing was performed by irradiating a transparent resin with ultraviolet light from an ultraviolet light lamp (200 mJ/cm$^2$ in a nitrogen atmosphere). In this manner, the anti-glare layer 3 was formed, and thus an anti-glare film of Comparative Example 2 was obtained.

Comparative Example 3

As the transparent base material, triacetyl cellulose (available from FUJIFILM Corporation, a thickness of 80 μm) was prepared.

Pentaerythritol triacrylate ("PE-3A" available from Kyoeisha Chemical Co., Ltd., a refractive index of 1.53) was used as a transparent resin. Then, with respect to 100 parts by mass of the transparent resin, 26 parts by mass of silica particles ("SS50F" available from Tosoh Silica Corporation, a refractive index of 1.47, an average particle diameter of 1.1 μm) and 6.6 parts by mass of polystyrene particles (a refractive index of 1.59, an average particle diameter of 3.5 μm) were included as transparent particles. Then, 5.3 parts by mass of the photopolymerization initiator A and 138 parts by mass of toluene (a boiling point at 110° C.) as a solvent are mixed with each other. As a result, the resin composition was obtained.

The resin composition was applied on the transparent base, and was dried for one minute while purging drying air at a flow speed of 0.2 m/s at 90° C. Note that, the coating thickness is 5 μm. After that, UV curing processing was performed by irradiating a transparent resin with ultraviolet light from an ultraviolet light lamp (200 mJ/cm$^2$ in a nitrogen atmosphere). In this manner, the anti-glare layer 3 was formed, and thus an anti-glare film of Comparative Example 3 was obtained.

Comparative Examples 4 and 5

Each of the anti-glare films in Comparative Examples 4 and 5 was manufactured by forming, on a substrate film, a coat layer which was formed of an ultraviolet light curable resin and had a surface with recesses and protrusions transferred thereon through use of a die. The manufacturing process of the anti-glare film with the transfer molding method has already described above, and hence detailed description thereof is omitted.

That is, the method of manufacturing the anti-glare film in Comparative Examples 4 and 5 included (a) coating the substrate film with the ultraviolet light curable resin precursor, (b) manufacturing the roll-shaped die having recesses and protrusions on the surface thereof by causing the blast particles to strike, (c) transferring the recesses and protrusions onto the surface of the ultraviolet light curable resin precursor that coated the substrate film, through use of the roll-shaped die, and (d) forming the coat layer having the surface with the recesses and protrusions formed thereon by curing, by irradiation with ultraviolet light, the ultraviolet light curable resin precursor onto which the recesses and protrusions are transferred.

Here, in (b), a roll-shaped die was manufactured while varying a value of a blast particle diameter to fall within a range of from 10 μm to 40 μm, and two kinds of films (Comparative Examples 4 and 5) having different haze (Hz) values were manufactured by the above-mentioned manufacturing methods.

Note that, a TAC (cellulose triacetate) film was suitably used as the substrate film. Further, each of the anti-glare films in Examples 1 to 4 and Comparative Examples 1 to 5 was evaluated by measuring the following items.

Haze and Total Light Transmittance

Measurement was performed using a haze meter ("NDH-5000W" available from NIPPON DENSHOKU INDUSTRIES CO., LTD.) in accordance with JIS K7136. The haze was measured under a condition in which the surface having the structure with the recesses and protrusions was on a side of an optical receiver.

Transmission Image Clarity

Measurement was performed using a mapping measuring instrument ("ICM-1T" available from Suga Test Instruments Co., Ltd.) in accordance with JIS K7105 under a condition in which the anti-glare film is installed, and thus the film-forming direction of the anti-glare film and the comb tooth direction of the optical comb were parallel with each other. The optical comb width was set to 0.5 mm.

60-Degree Gloss

Measurement was performed at an angle of 60° using a gloss meter ("IG-320" available from Horiba, Ltd.) in accordance with JIS K7105.

Standard Deviation of Luminance Distribution of Display (Sparkle Value)

As the display device 16, a smartphone ("Galaxy S4" available from Samsung Electronics Co., Ltd.) was used, and each of the sample anti-glare films was attached on the surface of the display 16a thereof by an optical clear adhesive. Note that, the display 16a of the smartphone has a resolution of 441 ppi. Further, the sparkle measurement apparatus 10 available from Komatsu NTC Ltd. was used, and a standard deviation (a sparkle value) of luminance distribution of the display 16a through each of the sample anti-glare films was measured. At the time of the measurement, at least one of an exposure time of the imaging device 12 or luminance of all the pixels of the display 16a was adjusted, and thus image data relating to a gray scale image with 8-bit gradation display and an average luminance of 170 tones was obtained.

Now, the measurement results with respect to the items described above are shown in Table 1.

TABLE 1

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Haze (%) | 43.8 | 31.4 | 49.8 | 45.5 | 31.2 | 36.7 | 48.7 | 48.6 | 36.9 |
| Transmissive clarity (%) | 4.5 | 22.6 | 59.8 | 2.9 | 29.1 | 36.7 | 27 | 63.5 | 81.4 |
| 60-Degree gloss (%) | 12 | 20 | 30 | 11 | 50 | 52 | 65 | 19.5 | 36 |
| Sparkle value | 8.2 | 9.5 | 7.4 | 7.9 | 10.9 | 9.3 | 7.7 | 6.6 | 7.3 |

As shown in Table 1, with the phase separation method based on the materials and the manufacturing conditions in Examples 1 to 3 and the fine particle dispersion method based on the materials and the manufacturing conditions in Example 4, the anti-glare films satisfying the above-mentioned conditions (the sparkle value falling within a range of from 6 to 10, the specular gloss of 30% or less, the transmission image clarity of 60% or less, the haze value of 50% or less) were able to be obtained.

That is, it was found out that the recesses and protrusions satisfying the above-mentioned conditions were able to be formed on the surface of the anti-glare film 1 by setting kinds of phase separation materials to be combined, a heating temperature for composition in a drying process, a flow rate of a drying air caused to blow against the composition, or a linear speed as in Examples 1 to 3.

Further, it was found out that the anti-glare film 1 satisfying the above-mentioned conditions was able to be formed in the following manner. That is, fine particles to be dispersed in the matrix resin were selected. Thus, a difference of refractive indexes of the fine particles and the matrix resin was set to a value falling within a range from 0 to 0.07, and the ratio G2/G1 of the weight G1 of the matrix resin to the total weight G2 of the plurality of fine particles included in the anti-glare layer falls within a range from 0.02 to 0.15. Then, manufacturing was performed under the manufacturing conditions provided in Example 4. That is, the fine particle dispersion method in Example 4, the following matter is conceivable. That is, materials were selected, and thus a repulsive interaction between the fine particles, and a resin or solvent other than the fine particles was strong when forming the anti-glare layer 3. Consequently, suitable aggregation of the fine particles was caused, and a distribution structure of steep recesses and protrusions with high number density was able to be formed on the anti-glare layer 3.

In contrast, by the fine particle dispersion method based on the raw materials and the manufacturing conditions in Comparative Examples 1 to 3, the anti-glare film satisfying the above-mentioned conditions was not able to be manufactured. That is, in Comparative Examples 1 and 2, a difference in refractive indexes of the fine particles and the matrix resin was greater than 0.07. In Comparative Example 3, the ratio G2/G1 of the weight G1 of the matrix resin to the total weight G2 of the plurality of fine particles included in the anti-glare layer was outside a range from 0.02 to 0.15.

Further, the recesses and protrusions controlled statistically were not able to be formed on the anti-glare film by the transfer molding method based on the raw materials and the manufacturing conditions in Comparative Examples 4 and 5, unlike the phase separation method as in, for example, Examples 1 to 3. Thus, the anti-glare film satisfying the above-mentioned conditions was not able to be manufactured.

The present invention is not limited to the above-mentioned embodiments, and change, addition, or elimination may be made to the configurations and the methods without departing from the gist of the present invention. For example, the fine particles in the second embodiment may be dispersed in the matrix resin of the anti-glare layer 3 in the first embodiment or the third embodiment.

REFERENCE SIGNS LIST

1 Anti-glare film
3 Anti-glare layer
16a Display

The invention claimed is:

1. An anti-glare film attached on a surface of a display, the anti-glare film comprising an anti-glare layer,
wherein the anti-glare layer is set to have a sparkle value falling within a range from 6 to 10, a value of specular gloss of 30% or less, a value of transmission image clarity of 4.5% or less, and a haze value of 50% or less,
wherein the sparkle value is defined based on a value of a standard deviation of luminance distribution of the display under a state in which the anti-glare film is attached on the surface of the display,
wherein the specular gloss is measured with 60-degree specular gloss,
wherein the transmission image clarity has an optical comb of 0.5 mm,
wherein the anti-glare layer includes a matrix resin and a plurality of fine particles dispersed in the matrix resin, the fine particles having an average particle diameter that is a value falling within a range from 0.5 μm to 5.0 μm, and
wherein the fine particles form recesses and protrusions on a surface of the anti-glare layer.

2. The anti-glare film according to claim 1, wherein the anti-glare layer includes a plurality of resin components, and
the anti-glare layer has a co-continuous phase structure formed by phase separation of the plurality of resin components.

3. The anti-glare film according to claim 1, wherein a difference of refractive indexes of the plurality of fine particles and the matrix resin falls within a range from 0 to 0.07.

4. The anti-glare film according to claim 1, wherein a ratio G2/G1 of a weight G1 of the matrix resin of the anti-glare layer to a total weight G2 of the plurality of fine particles included in the anti-glare layer is a value falling within a range from 0.02 to 0.15.

* * * * *